United States Patent
Dombrowski et al.

(10) Patent No.: US 8,501,855 B2
(45) Date of Patent: Aug. 6, 2013

(54) MULTISTAGE EMULSION POLYMER AND COATINGS FORMED THEREFROM

(75) Inventors: Gary W. Dombrowski, West Chester, PA (US); William J. Rosano, Hatboro, PA (US)

(73) Assignee: Rohm and Haas Company, Philadelphia, PA (US)

( * ) Notice: Subject to any disclaimer, the term of this patent is extended or adjusted under 35 U.S.C. 154(b) by 305 days.

(21) Appl. No.: 13/078,181

(22) Filed: Apr. 1, 2011

(65) Prior Publication Data

US 2011/0244134 A1    Oct. 6, 2011

Related U.S. Application Data

(60) Provisional application No. 61/341,575, filed on Apr. 1, 2010.

(51) Int. Cl.
*C08F 265/00* (2006.01)

(52) U.S. Cl.
USPC ........... 524/457; 524/458; 524/500; 526/201; 525/902

(58) Field of Classification Search
USPC ........... 524/457, 500, 458; 526/201; 525/902
See application file for complete search history.

(56) References Cited

U.S. PATENT DOCUMENTS

| | | | |
|---|---|---|---|
| 4,497,917 | A | 2/1985 | Upson |
| 4,916,171 | A | 4/1990 | Brown |
| 5,212,251 | A | 5/1993 | Lorah |
| 5,266,646 | A | 11/1993 | Eisenhart |
| 5,744,540 | A | 4/1998 | Baumstark |
| 5,962,571 | A | 10/1999 | Overbeek |
| 5,990,228 | A | 11/1999 | Eichman |
| 2003/0129435 | A1* | 7/2003 | Blankenship et al. ........ 428/515 |
| 2005/0203211 | A1* | 9/2005 | Gebhard ....................... 523/205 |

FOREIGN PATENT DOCUMENTS

| | | |
|---|---|---|
| EP | 0587333 B1 | 3/1994 |
| EP | 0609756 A2 | 8/1994 |
| EP | 1325936 A1 | 7/2003 |
| EP | 1574533 A1 | 9/2005 |

* cited by examiner

*Primary Examiner* — Kelechi Egwim
(74) *Attorney, Agent, or Firm* — Ron D. Bakule; Karl E. Stauss

(57) ABSTRACT

A multi-stage aqueous emulsion polymer, an aqueous coating composition including the emulsion polymer, and a method for providing a coating including the emulsion polymer are provided. The multistage emulsion polymer includes from 10% to 30% by wt., based on the wt. of the multistage emulsion polymer, of a first polymer shell having an acid number of from 5 to 100, the first polymer having a calculated Mn of from 1000 to 4500 and a calculated Tg of lower then 100° C.; and from 70% to 90% by wt., based on the wt. of the multi-stage emulsion polymer, of a second polymer core having an acid number of from 0 to one-half the acid number of the first polymer, the second polymer having a calculated Mn of greater than 20,000.

9 Claims, No Drawings

MULTISTAGE EMULSION POLYMER AND COATINGS FORMED THEREFROM

This application claims the benefit of priority under 35 U.S.C. §119(e) of U.S. Provisional Patent Application No. 61/341,575 filed on Apr. 1, 2010.

This invention relates to a multi-stage aqueous emulsion polymer. This invention also relates to an aqueous coating composition and a method for providing a coating including a multi-stage aqueous emulsion polymer. More particularly, this invention relates to a multistage emulsion polymer including: from 10% to 30% by wt., based on the wt. of the multistage emulsion polymer, of a first polymer shell having an acid number of from 5 to 100, the first polymer having a calculated Mn of from 1000 to 4500 and a calculated Tg of lower then 100° C.; and from 70% to 90% by wt., based on the wt. of the multistage emulsion polymer, of a second polymer core having an acid number of from 0 to one-half the acid number of the first polymer, the second polymer having a calculated Mn of greater than 20,000. As regulations and customer demand push the coating market to lower volatile organic levels, there remains a need for coatings manufacturers to deliver the properties obtainable at higher VOC levels at the lower VOC targets proposed and expected in the future. The present invention serves to provide a multi-stage emulsion polymer binder suitable for use in decorative and/or protective coatings for various substrates which coatings maintain a desirable balance of coatings properties, particularly including good film formation and scrub resistance, especially when relatively low levels of coalescent are employed, i.e., in low VOC coatings.

U.S. Pat. No. 4,916,171 discloses a core-shell aqueous emulsion-polymer including an alkali-insoluble emulsion polymer core and an alkali-soluble emulsion polymer shell. The shell polymer preferably has a molecular weight of about 5,000 to about 50,000 weight average as determined by gel permeation chromatography and has a Tg preferably of at least about 100° C. However, improvements in the balance of coatings properties obtainable from coatings particularly those employing low levels of coalescent are still desired. The problem faced by the inventors is the provision of an emulsion polymer suitable for use in aqueous coatings which provide dried coatings that maintain a desirable balance of coatings properties, particularly including good scrub resistance, especially when relatively low levels of coalescent are employed, i.e., in low VOC coatings. We have discovered that if the molecular weight and acid number of the first polymer is judiciously selected, the scrub resistance of the coating increased considerably, and that if the neutralizer is carefully selected, water resistance is not compromised.

In a first aspect of the present invention there is provided a multistage emulsion polymer comprising: from 10% to 30% by wt., based on the wt. of said multistage emulsion polymer, of a first polymer shell having an acid number of from 5 to 100, said first polymer having a calculated Mn of from 1000 to 4500 and a calculated Tg of lower then 100° C.; and from 70% to 90% by wt., based on the wt. of said multistage emulsion polymer, of a second polymer core having an acid number of from 0 to one-half the acid number of said first polymer, said second polymer having a calculated Mn of greater than 20,000.

In a second aspect of the present invention there is provided an aqueous coating composition comprising a multi-stage aqueous emulsion polymer. An aqueous coating composition comprising a multi-stage aqueous emulsion polymer comprising from 10% to 30% by wt., based on the wt. of said multistage emulsion polymer, of a first polymer shell having an acid number of from 5 to 100, said first polymer having a calculated Mn of from 1000 to 4500 and a calculated Tg of lower than 100° C.; and from 70% to 90% by wt., based on the wt. of said multistage emulsion polymer, of a second polymer core having an acid number of from 0 to one-half the acid number of said first polymer, said second polymer having a calculated Mn of greater than 20,000.

In a third aspect of the present invention there is provided a method for providing a coating comprising (a) forming an aqueous coating composition comprising a multi-stage aqueous emulsion polymer comprising from 10% to 30% by wt., based on the wt. of said multistage emulsion polymer, of a first polymer shell having an acid number of from 5 to 100, said first polymer having a calculated Mn of from 1000 to 4500 and a calculated Tg of lower than 100° C.; and from 70% to 90% by wt., based on the wt. of said multistage emulsion polymer, of a second polymer core having an acid number of from 0 to one-half the acid number of said first polymer, said second polymer having a calculated Mn of greater than 20,000; (b) applying said aqueous coating composition to a substrate; and (c) drying, or allowing to dry, said applied aqueous coating composition.

The multi-stage aqueous emulsion polymer includes from 10% to 30%, preferably from 15% to 25%, by wt., based on the wt. of said multistage emulsion polymer, of a first polymer shell having an acid number of from 5 to 100, the first polymer having a calculated number average molecular weight ("Mn") of from 1000 to 4500 and a calculated glass transition temperature ("Tg") of lower than 100° C. By "multi-stage aqueous emulsion polymer" herein is meant an emulsion polymer prepared by the sequential addition of two or more different monomer compositions. By "first polymer" and "second polymer" herein are meant two polymers having different compositions regardless of the order in which they were prepared in a multi-stage emulsion polymerization process. By "first-stage polymer" herein is meant the emulsion polymer of the first polymer and second polymer that is formed first; by "second-stage polymer" herein is meant a polymer which is formed in the presence of the first-stage polymer. However, the first-stage polymer may be formed in the presence of a previously formed dispersed polymer in an amount of 0-10%, by weight based on the weight of the first-stage polymer, sometimes known as a seed polymer, of a composition the same as or different from that of the first-stage polymer. One or more additional stages may be formed before or after the first- or second-stage polymer but they shall not constitute in totality more than 25% by weight of the total weight of the first and second polymers. Neither the weight nor composition of any seed polymer or any additional stage(s) polymer shall be included in the weight, composition, Mn, acid number, or calculated Tg of the first polymer or the second polymer.

The first polymer and the second polymer each typically include at least one nonionic copolymerized ethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth) acrylic acid; styrene or substituted styrenes; vinyl toluene; butadiene; monoethylenically unsaturated acetophenone or benzophenone derivatives such as, for example are taught in U.S. Pat. No. 5,162,415; vinyl acetate or other vinyl esters; vinyl monomers such as vinyl chloride, vinylidene chloride, and N-vinyl pyrollidone; (meth)acrylonitrile; N-alkylol (meth)acrylamide. The use of the term "(meth)" followed by another term such as (meth)acrylate or (meth)acrylamide, as used throughout the disclosure, refers to both acrylates or acrylamides and methacrylates and methacrylamides, respectively. In certain embodiments the first polymer or the second polymer, independently, contains less than 5 wt. %, or in the alternative, less than 1 wt. %, or less than 0.2%, based on the weight of the polymer, of a copolymerized multi-ethylenically unsaturated monomer. In certain embodiments the first polymer or the second polymer, independently, is free from copolymerized multi-ethylenically unsaturated monomer. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The first polymer has an acid number of from 5 to 100, preferably from 30 to 65. The acid number herein was calculated by determining the number of milliequivalents of acid per gram in the first polymer based only upon the copolymerized monoethylenically-unsaturated acid monomer in the first polymer, and multiplying by the molecular weight of potassium hydroxide. The second polymer has an acid number of from 0 to half the acid number in the first polymer, based only upon the copolymerized monoethylenically-unsaturated acid monomer in the second polymer. Acid monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. Preferred acid monomers for copolymerization into the first polymer and the second polymer, independently, are carboxylic acid monomers. More preferred monomers are (meth)acrylic acid.

The calculated glass transition temperature ("Tg") of the first polymer is lower than 100° C., preferably lower than 80° C. Tgs of the polymers are calculated herein by using the Fox equation (T. G. Fox, Bull. Am. Physics Soc., Volume 1, Issue No. 3, page 123 (1956)). that is, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in "Polymer Handbook", edited by J. Brandrup and E. H. Immergut, Interscience Publishers. In certain embodiments the calculated Tg of the second polymer is from −25° C. to 105° C., in the alternative, from −25° C. to 35° C.

The calculated number average molecular weight, Mn, of the first polymer is from 1000 to 4500. The calculated Mn of the second polymer is greater than 20,000. Mns lower than about 50,000 are typically achieved by using a chain transfer agent. Molecular weights (Mn) herein are those calculated by determining the sum of the moles of each monomer present, and dividing by the moles of chain transfer agent used. If no moles of chain transfer agent are used the calculated Mn of the polymer is taken as 1,000,000. The chain transfer agent, if used, is preferably taken from the thiols, such as, for example, dodecylmercaptan, butylmercaptopropionate, methylmercaptopropionate, mercaptopropionic acid, etc. In forming the first polymer, the chain transfer agent and acid monomer are preferably fed simultaneously.

In the multi-stage emulsion polymerization process at least two stages different in composition are formed in sequential fashion. Preferred is a multi-stage emulsion polymerization process in which the first polymer is a first-stage polymer and the second polymer is a second-stage polymer, i.e., the second polymer is formed by emulsion polymerization in the presence of the first emulsion polymer. In any event the weight of the second stage polymer is from 70% to 90%, preferably from 75% to 85%, of the total weight of the multistage emulsion polymer, based on dry polymer weights. The polymerization techniques used to prepare such aqueous multi-stage emulsion-polymers are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Redox processes are preferred. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages.

Neutralizers can be selected from mineral bases such as sodium hydroxide, potassium hydroxide, salts of phosphoric acid, organic amines such as, for example, alkyl hydroxylamine, and ammonia. Selection of a single neutralizer or combinations thereof generally depends on the desired balance between odor, e.g., potentially from high ammonia levels, VOC level, e.g. from a volatile organic amine, water sensitivity, scrub resistance, blocking resistance, etc. For example, water resistance of the coating can become compromised if too much permanent mineral base (such as sodium hydroxide) is present in the dried film. For the present invention preferred is a combinations of ammonia and a mineral base such as potassium or sodium hydroxide to provide the best overall balance of paint film properties.

A multi-stage emulsion polymerization process usually results in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the phases, for example, is such a technique. The multistage emulsion polymer herein is referred to as a core/shell polymer. The polymer particles include two or more phases of various geometries such as, for example, core/shell or core/sheath particles, core/shell particles with shell phases incompletely encapsulating the core, and core/shell particles with a multiplicity of cores.

The average particle diameter of the emulsion-polymerized polymer particles is typically from 30 to 500 nanometers, preferably from 80 to 200 nanometers. Processes yielding polymodal particle size distributions such as those disclosed in U.S. Pat. Nos. 4,384,056 and 4,539,361, for example, may be employed.

The aqueous coating composition is prepared by techniques which are well known in the coatings art. First, pigment(s), if desired, are well dispersed in an aqueous medium under high shear such as is afforded by a COWLES (R) mixer or predispersed colorant(s), or mixtures thereof are used. Then the multi-stage emulsion-polymer is added under low shear stirring along with other coatings adjuvants as desired. The aqueous coating composition may contain, in addition to the multi-stage emulsion polymer and optional pigment(s), film-forming or non-film-forming solution or emulsion polymers in an amount of 0% to 300% by weight of the multistage emulsion polymer, and conventional coatings adjuvants such as, for example, emulsifiers, coalescing agents, plasticizers, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellants, and anti-oxidants. In certain embodiments a photosensitive compound such as, for example, benzophenone or a substituted acetophenone or benzophenone derivative as is taught in U.S. Pat. No. 5,162,415 may be added. In certain embodiments the aqueous coating composition of the invention has a VOC (volatile organic compound) level of 150 or less g/liter of coating, alternatively of 100 g/liter or less, or further alternatively of 50 g/liter or less.

The present invention can be used in a wide range of pigmented coating formulations including, for example, one or more of white pigments (e.g., TiO2), extender pigments (e.g., CaCO3), functional pigments (e.g., ZnO). The amounts of pigment in the aqueous coating composition vary from a pigment volume concentration (PVC) of from 0% to 85% and thereby encompass coatings otherwise described in the art, for example, as clear coatings, stains, flat coatings, satin coatings, semi-gloss coatings, gloss coatings, primers, textured coatings, and the like. The pigment volume concentration is calculated by the following formula:

$$PVC\ (\%) = \frac{\text{volume of pigment(s)}, + \text{volume extender(s)} \times 100}{\text{total dry volume of paint}}$$

The pigment volume concentration (PVC) of the coating formulation is preferably from 2% to 65% and more preferably from 10% to 50%.

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably.

The aqueous coating composition is typically applied to a substrate such as, for example, wood, metal, plastics, cementitious substrates such as, for example, concrete, stucco, and mortar, previously painted or primed surfaces, and weathered surfaces. The aqueous coating composition may be applied to a substrate using conventional coatings application methods such as, for example, curtain coater and spraying methods such as, for example, air-atomized spray, air-assisted spray, airless spray, high volume low pressure spray, and air-assisted airless spray.

Drying of the aqueous coating composition may be allowed to proceed under ambient conditions such as, for example, at 5° C. to 35° C. or the coating may be dried at elevated temperatures such as, for example, from 35° C. to 150° C.

| Abbreviations | | Tg |
|---|---|---|
| Butyl acrylate | BA | −54 |
| Methyl methacrylate | MMA | 105 |
| Methacrylic acid | MAA | 185 |
| Hydroxyethyl methacrylate | HEMA | 55 |
| Ureidomethacrylate adhesion monomer | UMA | 100 |
| 3-Butylmercaptopropionate | BMP | |
| Methylmercaptopropionate | MMP | |
| t-Amylhydroperoxide, 85% | AHP | |
| Isoascorbic acid | IAA | |
| Sodium persulfate, 99% | NaPS | |
| Surfactant A = Alkylpolyethoxyphosphate, ammonium salt (25%) | | |
| DI water = deionized water | | |

EXAMPLE 1

Formation of Multistage Emulsion Polymer

Monomer mixture 1 was prepared by mixing 116.8 g DI water, 17.1 g Surfactant A, 70.3 g BA, 302.4 g MMA, 22.4 g MAA, 22.4 g HEMA and 28.5 g BMP. Monomer emulsion 2 was prepared from 516.6 g DI water, 81.4 g Surfactant A, 923.3 g BA, 712.9 g MMA, and 33.4 g UMA. A flask is charged with 720 g DI water and 35.1 g Surfactant A, 1.6 g sodium sulfate, and then brought to 80° C. under a nitrogen purge. The flask was charged with a solution of 0.03 g ferrous sulfate heptahydrate, 0.02 g ethylenediaminetetraacetate, tetrasodium salt, in 15 g DI water, followed by a 15 g DI water rinse. Monomer emulsion 1 was fed to the reactor at a rate of 13.78 g/min for 10 minutes, then increased to 27.57 g/min for the remaining material. A mixture of 6.5 g of NaPS in 183 g DI water was added to the reactor at a rate of 1.43 g/min, and a solution of 4.2 g of IAA in 131.7 g DI water was simultaneously added to the kettle at a rate of 0.1.04 g/min. At the completion of addition of monomer emulsion 1, the reaction was held at temperature for 15 minutes during which time the cofeeds were continued. A small sample was then removed for molecular weight analysis by gel permeation chromatography.

Monomer emulsion 2 was then fed to the reactor over approximately 90 minutes, 25.8 g/min. Ten minutes after the monomer emulsion 2 feeds began, the kettle pH was adjusted to between 7.5 and 8.5 by the addition of 10 g aqueous ammonium hydroxide (30%) solution. At the intercept point, 4 g of 50% sodium hydroxide solution in 10 g DI water were added to the IAA cofeed solution and its feed rate increased to 1.37 g/min. At the completion of the monomer emulsion feed, the line was rinsed and the reactor was allowed to stir for 5 minutes at 80 C, while the cofeed solutions continued. At the completion of the feeds, the cofeed lines were rinsed, then the contents cooled. At 50° C., the latex was charged with sodium hydroxide solution to pH=9.0, and then cooled to room temperature. The latex was then filtered to remove any coagulum.

EXAMPLES 2-4 AND COMPARATIVE EXAMPLES A-E

Polymers were prepared using the procedure outlined for Example 1. Feed rates were kept constant for the monomer emulsions, but cofeeds altered to account for the different stage ratios. The weights for the monomer emulsions are detailed in Table 7.1.

EXAMPLE 5

Formation of Multistage Emulsion Polymer

Monomer mixture 1 was prepared by mixing 15 g DI water, 26.1 g MAA, 10.4 g HEMA and 35.7 g BMP, and 15.7 g UMA. A monomer emulsion was prepared from 585 g DI water, 98.5 g Surfactant A, 1099.7 g BA, and 899.7 g MMA. A separate vessel was charged with 582.3 g of the monomer emulsion, to which all of the monomer mixture 1 was added. This mixture constituted monomer emulsion 1 of the polymerization.

A flask was charged with 784 g DI water and 49.1 g Surfactant A, 1.6 g sodium sulfate, and then brought to 80° C. under a nitrogen purge. The flask was charged with a solution of 0.03 g ferrous sulfate heptahydrate, 0.02 g ethylenediaminetetraacetate, tetrasodium salt, in 15 g of DI water, followed by a 15 g DI water rinse. Monomer emulsion 1 was fed to the reactor at a rate of 13.78 g/min for 10 minutes, then increased to 27.57 g/min for the remaining material. A mixture of 5.6 g of APS in 160.9 g DI water was added to the reactor at a rate of 1.43 g/min, and a solution of 3.7 g IAA in 116.1 g DI water was simultaneously added to the kettle at a rate of 0.1.04 g/min. At the completion of addition of monomer emulsion 1, a small sample was removed for molecular weight analysis by gel permeation chromatography.

Monomer emulsion 2 was immediately fed to the reactor over 80 minutes, 27.57 g/min. Ten minutes after the monomer emulsion 2 feeds began, the kettle pH was adjusted to between 7.0 and 8.0 by the addition of 20 g aqueous ammonium hydroxide (30%) solution. At the intercept point, 10 g aqueous ammonium hydroxide (30%) solution was added to the reducing cofeed solution and its feed rate increased to 1.37 g/min. At the completion of the monomer emulsion feed, the line was rinsed and the reactor was allowed to stir for 5 minutes at 80 C, while the cofeed solutions continued. At the completion of the feeds, the cofeed lines were rinsed, then the contents cooled. At 65° C., a solution of 1 g AHP in 10 g DI Water was added. At 50° C., the latex was charged with ammonium hydroxide solution to pH=9.0, and extra water added to dilute to approximately 50% solids, then cooled to room temperature. The latex was then filtered to remove any coagulum.

EXAMPLE 6

Formation of Multistage Emulsion Polymer

Monomer mixture 1 was prepared by mixing 15 g DI water, 26.1 g MAA, 10.4 g HEMA and 35.7 g BMP. A monomer emulsion was prepared from 585 g DI water, 98.5 g Surfactant A, 1099.7 g BA and 899.7 g MMA. A separate vessel was charged with 601.1 g of the monomer emulsion, to which all of the monomer mixture 1 was added. This mixture constituted monomer emulsion 1 of the polymerization. To the remaining monomer non-acid monomer mixture was added 15.7 g UMA.

A flask was charged with 784 g DI water and 49.1 g Surfactant A, 1.6 g sodium sulfate, and then brought to 80° C. under a nitrogen purge. The flask was charged with a solution of 0.03 g ferrous sulfate heptahydrate, 0.02 g ethylenediaminetetraacetate, tetrasodium salt, in 15 g of DI water, followed by a 15 g DI water rinse. Monomer emulsion 1 was fed to the reactor at a rate of 13.78 g/min for 10 minutes, then increased to 27.57 g/min for the remaining material. A mixture of 5.6 g of APS in 160.9 g of water was added to the reactor at a rate of 1.43 g/min, and a solution of 3.7 g IAA in 116.1 g DI water was simultaneously added to the kettle at a rate of 0.1.04 g/min. At the completion of addition of monomer emulsion 1, a small sample was removed for molecular weight analysis by gel permeation chromatography.

Monomer emulsion 2 was immediately fed to the reactor over 80 minutes, 27.57 g/min. Ten minutes after the monomer emulsion 2 feeds began, the kettle pH was adjusted to between 7.0 and 8.0 by the addition of 20 g aqueous ammonium hydroxide (30%) solution. At the intercept point, 10.5 g aqueous ammonium hydroxide (30%) solution was added to the reducing cofeed solution and its feed rate increased to 1.37 g/min. At the completion of the monomer emulsion feed, the line was rinsed and the reactor was allowed to stir for 5 minutes at 80 C, while the cofeed solutions continued. At the completion of the feeds, the cofeed lines were rinsed, then the contents cooled. At 65° C., a solution of 1 g of AHP in 10 g of DI Water was added. At 50° C., the latex was charged with ammonium hydroxide solution to pH=9.0, and extra water added to dilute to approximately 50% solids, then cooled to room temperature. The latex was then filtered to remove any coagulum.

EXAMPLE 7

Formation of Multistage Emulsion Polymer

Monomer mixture 1 was prepared by mixing 15 g DI water, 26.1 g MAA, 10.4 g HEMA and 28.6 g BMP, and 15.7 g UMA. A monomer emulsion was prepared from 585 g DI water, 98.5 g Surfactant A, 1103.3 g BA, and 903.3 g MMA. A separate vessel was charged with 591.3 g of the monomer emulsion, to which all of the monomer mixture 1 was added. This mixture constituted monomer emulsion 1 of the polymerization.

A flask was charged with 784 g DI water and 49.1 g Surfactant A, 1.6 g sodium sulfate, and then brought to 80° C. under a nitrogen purge. The flask was charged with a solution of 0.03 g ferrous sulfate heptahydrate, 0.02 g ethylenediaminetetraacetate, tetrasodium salt, in 15 g DI water, followed by a 15 g DI water rinse. Monomer emulsion 1 was fed to the reactor at a rate of 13.78 g/min for 10 minutes, then increased to 27.57 g/min for the remaining material. A mixture of 5.6 g of APS in 160.9 g DI water was added to the reactor at a rate of 1.43 g/min, and a solution of 3.7 g IAA in 116.1 g DI water was simultaneously added to the kettle at a rate of 0.1.04 g/min. At the completion of addition of monomer emulsion 1, a small sample was removed for molecular weight analysis by gel permeation chromatography.

Monomer emulsion 2 was immediately fed to the reactor over 80 minutes, 27.57 g/min. Ten minutes after the monomer emulsion 2 feeds began, the kettle pH was adjusted to between 7.0 and 8.0 by the addition of 20 g aqueous ammonium hydroxide (30%) solution. At the intercept point, 10 g aqueous ammonium hydroxide (30%) solution in was added to the reducing cofeed solution and its feed rate increased to 1.37 g/min. At the completion of the monomer emulsion feed, the line was rinsed and the reactor was allowed to stir for 5 minutes at 80 C, while the cofeed solutions continued. At the completion of the feeds, the cofeed lines were rinsed, then the contents cooled. At 65° C., a solution of 1 g of AHP in 10 g DI Water was added. At 50° C., the latex was charged with ammonium hydroxide solution to pH=9.0, and extra water added to dilute to approximately 50% solids, then cooled to room temperature. The latex was then filtered to remove any coagulum.

EXAMPLE 8

Formation of Multistage Emulsion Polymer

Monomer mixture 1 was prepared by mixing 15 g DI water, 26.1 g MAA, 10.4 g HEMA, 21.4 g BMP and 15.7 g UMA. A monomer emulsion was prepared from 585 g DI water, 98.5 g Surfactant A, 1106.9 g BA, and 906.9 g MMA. A separate vessel was charged with 600.4 g of the monomer emulsion, to which all of the monomer mixture 1 was added. This mixture constituted monomer emulsion 1 of the polymerization.

A flask was charged with 784 g DI water and 49.1 g Surfactant A, 1.6 g sodium sulfate, and then brought to 80° C. under a nitrogen purge. The flask was charged with a solution of 0.03 g ferrous sulfate heptahydrate, 0.02 g ethylenediaminetetraacetate, tetrasodium salt, in 15 g of DI water, followed by a 15 g DI water rinse. Monomer emulsion 1 was fed to the reactor at a rate of 13.78 g/min for 10 minutes, then increased to 27.57 g/min for the remaining material. A mixture of 5.6 g of APS in 160.9 g DI water was added to the reactor at a rate of 1.43 g/min, and a solution of 3.7 g IAA in 116.1 g DI water was simultaneously added to the kettle at a rate of 0.1.04 g/min. At the completion of addition of monomer emulsion 1, a small sample was removed for molecular weight analysis by gel permeation chromatography.

Monomer emulsion 2 was immediately fed to the reactor over 80 minutes, 27.57 g/min. Ten minutes after the monomer emulsion 2 feeds began, the kettle pH was adjusted to between 7.0 and 8.0 by the addition of 20 g aqueous ammonium hydroxide (30%) solution. At the intercept point, 10 g of aqueous ammonium hydroxide (30%) solution in were added to the reducing cofeed solution and its feed rate increased to 1.37 g/min. At the completion of the monomer emulsion feed, the line was rinsed and the reactor was allowed to stir for 5 minutes at 80 C, while the cofeed solutions continued. At the completion of the feeds, the cofeed lines were rinsed, then the contents cooled. At 65° C., a solution of 1 g of AHP in 10 g DI Water was added. At 50° C., the latex was charged with ammonium hydroxide solution to pH=9.0, and extra water added to dilute to approximately 50% solids, then cooled to room temperature. The latex was then filtered to remove any coagulum.

EXAMPLE 9

Formation of Aqueous Coating Compositions

Test paints based on the multistage emulsion polymers were made using the formulation shown below.

TABLE 9.1

| Formation of aqueous coating composition | |
|---|---|
| Material | Parts by Weight |
| Charged the following to a dispersing vessel | |
| TERGITOL ™ TMN-100X(90%) | 2.00 |
| Water | 70.00 |
| FOAMSTAR ™ A-34 | 2.00 |
| TAMOL ™ 731A | 15.57 |
| Added the following in order and dispersed at 1500 rpm for 20 minutes | |
| TI-PURE ™ R-706 | 239.57 |
| MINEX ™ 10 | 15.00 |

TABLE 9.1-continued

| Formation of aqueous coating composition | |
|---|---|
| Material | Parts by Weight |
| ATTAGEL ™ 50 | 5.00 |
| ROPAQUE ™ Ultra | 30.18 |
| Water | 45.00 |
| ACRYSOL ™ RM-6000 | 32.00 |
| ACRYSOL ™ RM-895 | 0.00 |
| FOAMSTAR ™ A-34 | 1.00 |
| Polymer of Example 1 | 461.52 |
| Water | 137.74 |
| Adjusted pH to 8.8 with 10% sodium hydroxide solution | |
| Totals | 1056.58 |
| Formulation Constants | |
| Total PVC | 28.44 |
| Volume Solids | 35.00 |
| Weight Solids | 47.78 |

TERGITOL ™, TAMOL ™, ROPAQUE ™ are registered trademarks of The Dow Chemical Company. ATTAGEL ™ is a registered trademark of The BASF Corporation. MINEX ™ is a registered trademark of the Unimin Corporation. FOAMSTAR ™ is a registered trademark of the Cognis Corporation. TIPURE ™ is a registered trademark of DuPont.

EXAMPLE 10

Testing of Aqueous Coating Compositions

Abrasive Scrub Resistance.

Test coatings prepared according to Example 9 were applied to black vinyl scrub charts (The Leneta Company) and allowed to dry, for 7 days, in a room where the temperature and relative humidity were held at 75° F. and 55% relative humidity respectively. Abrasive scrub resistance was determined in accordance with ASTM standard D2486-06 using Test Method A (cycles to failure).

Low Temperature Film Formation (LTFF).

Low Temperature Film formation was determined as follows. Test coatings prepared according to Example 9 and test charts (Form WB from The Leneta Company) were placed overnight in a controlled environmental room (CER) where the temperature and relative humidity was held at 40° F. and 40% respectively. Test coatings were applied in (CER) controlled to the test charts using a 3 mil Bird applicator, allowed to dry for approximately 24 hours and rated according to the scale shown below.

TABLE 10.1

| Low Temperature Film Formation Rating Scale for Cracking | | |
|---|---|---|
| Rating | Description | Approximate no. cracks/in$^2$ |
| 10 | None | 0 |
| 8 | Few | $\leq 2$ |
| 6 | Medium-Few | $>2, \leq 5$ |
| 4 | Medium | $>5, \leq 10$ |
| 2 | Medium-Dense | $>10, \leq 20$ |
| 0 | Dense | $>20$ |

Water Resistance

Test paints were applied to test charts (The Leneta Company) using a Dow Bar with a 7 mil opening and allowed to dry, for 3 days, in a room where the temperature and relative humidity were held at 75° F. and 55% respectively. 10 cc of tap water was allowed to stand for 15 minutes on the test paints after which was blotted dry. Blister formation was rated in accordance to ASTM D714-02.

EXAMPLE 11

Evaluation of Coatings Including Multistage Emulsion Polymer

TABLE 11.1

Multistage emulsion polymer compositions and coating evaluations

| | Example 1 | Example 2 | Example 3 | Example 4 | Example Comp. A | Example Comp. B | Example Comp. C | Example Comp. D | Example Comp. E |
|---|---|---|---|---|---|---|---|---|---|
| % Stage 1 | 20 | 20 | 25 | 25 | 22.5 | 20 | 20 | 25 | 25 |
| DI Water | 116.8 | 116.8 | 116.8 | 116.8 | 116.8 | 116.8 | 116.8 | 116.8 | 116.8 |
| Surfactant A | 17.1 | 17.1 | 17.1 | 17.1 | 17.1 | 17.1 | 17.1 | 17.1 | 17.1 |
| BA | 70.3 | 70.3 | 87.7 | 87.7 | 79.1 | 70.3 | 70.3 | 87.7 | 87.7 |
| MMA | 302.4 | 302.4 | 377.8 | 377.8 | 340.2 | 302.4 | 302.4 | 377.8 | 377.8 |
| MAA | 22.4 | 44.9 | 28.2 | 56.4 | 35.2 | 22.4 | 44.9 | 28.2 | 56.4 |
| HEMA | 22.4 | 0 | 28.2 | 0 | 15.3 | 22.4 | 0 | 28.2 | 0 |
| BMP | 28.5 | 28.5 | 35.7 | 35.7 | 15 | 8.7 | 8.8 | 10.9 | 10.9 |
| Mn (calc) | 2599 | 2601 | 2595 | 2596 | 5987 | 8081 | 7990 | 8063 | 8060 |
| Mn (GPC, expt) | 2756 | 2753 | 2617 | 2698 | 5269 | 7493 | 6749 | 8417 | 8126 |
| Acid Number | 35.09 | 70.32 | 35.34 | 70.68 | 49.03 | 35.09 | 70.32 | 35.34 | 70.68 |
| Fox Tg | 64 | 70 | 64 | 70 | 66 | 64 | 70 | 64 | 70 |
| % Stage 2 | 80 | 80 | 75 | 75 | 77.5 | 80 | 80 | 75 | 75 |
| DI Water | 516.6 | 516.6 | 514.5 | 514.5 | 515.6 | 516.6 | 516.6 | 514.5 | 514.5 |
| Surfactant A | 81.4 | 81.4 | 81.4 | 81.4 | 81.4 | 81.4 | 81.4 | 81.4 | 81.4 |
| BA | 923.3 | 923.3 | 865.6 | 865.6 | 894.4 | 923.3 | 923.3 | 865.6 | 865.6 |
| MMA | 712.9 | 712.9 | 668.4 | 668.4 | 690.6 | 712.9 | 712.9 | 668.4 | 668.4 |
| UMA | 33.4 | 33.4 | 31.3 | 31.3 | 32.4 | 33.4 | 33.4 | 31.3 | 31.3 |
| Fox Tg | −3 | −3 | −3 | −3 | −3 | −3 | −3 | −3 | −3 |
| Particle Size (light scattering, nm) | 133 | 120 | 134 | 132 | 110 | 113 | 136 | 127 | 119 |
| Solids | 51.3% | 49.6% | 50.3% | 48.8% | 49.5% | 50.7% | 48.9% | 50.4% | 47.5% |
| MFFT (mech) | 7 | 7 | 9 | 9 | 10 | 10 | 8 | 11 | 10 |
| LTFF | 2 | 7 | 2 | 10 | 3 | 1 | 6 | 1 | 4 |
| Water Resistance | No Blisters | 9 md | No Blisters | 4, 8 d | 10 d | No Blisters | 9 d | 10 d | 6, 8 d |
| Scrub resistance | 1319 | 1596 | 1055 | 1886 | 245 | 247 | 150 | 96 | 75 |

Coating compositions of this invention including multistage emulsion polymers of this invention, Examples 1-4, demonstrate superior scrub resistance compared to those of Comparative Examples A-E.

EXAMPLE 12

Evaluation of Coatings Including Multistage Emulsion Polymer

TABLE 12.1

Multistage emulsion polymer compositions and coating evaluations.

| | Example 5 | Example 6 | Example 7 | Example 8 |
|---|---|---|---|---|
| % Stage 1 | 23.7 | 23.6 | 24.0 | 24.2 |
| DI Water | 157.6 | 146.1 | 159.2 | 160.9 |
| Surfactant A | 21.4 | 22.1 | 21.7 | 21.9 |
| BA | 238.7 | 246.4 | 242.5 | 246.4 |
| MMA | 195.3 | 201.6 | 198.6 | 201.9 |
| MAA | 26.1 | 26.1 | 26.1 | 26.1 |
| HEMA | 10.4 | 10.4 | 10.4 | 10.4 |
| BMP | 35.7 | 35.7 | 28.6 | 21.4 |
| UMA | 15.7 | 0 | 15.7 | 15.7 |
| Mn (calc) | 2331 | 2426 | 2943 | 3927 |
| Mn (GPC, expt) | 4218 | 3992 | 4984 | 6311 |
| Acid Number | 35.11 | 35.23 | 34.60 | 34.10 |
| Fox Tg | 7 | 4 | 7 | 7 |
| % Stage 2 | 76.3 | 76.4 | 76 | 75.8 |
| DI Water | 458 | 469.6 | 456.4 | 454.8 |
| Surfactant A | 77.1 | 76.4 | 76.8 | 76.6 |
| BA | 861.0 | 853.3 | 860.8 | 860.5 |
| MMA | 704.4 | 698.1 | 704.7 | 705.0 |
| Adh Mon | 0 | 15.7 | 0 | 0 |
| Fox Tg | −3 | −2 | −3 | −3 |
| Particle Size (light scattering, nm) | 114 | 112 | 115 | 127 |
| Solids | 50.2% | 51.2% | 50.6% | 51.2% |
| Paint LTC | 10 | 10 | 10 | 10 |
| Scrub resistance | 2730 | 2904 | 3324 | 2056 |

Coating compositions of this invention including multistage emulsion polymers of this invention, Examples 5-8, demonstrate an acceptably high level of scrub resistance regardless of the placement of the UMA in the core or shell stage of the multistage emulsion polymer

What is claimed is:

1. A multistage emulsion polymer comprising:
   from 10% to 30% by wt., based on the wt. of said multistage emulsion polymer, of a first polymer shell having an acid number of from 5 to 100, said first polymer having a calculated Mn of from 1000 to 4500 and a calculated Tg of lower than 100° C.; and
   from 70% to 90% by wt., based on the wt. of said multistage emulsion polymer, of a second polymer core having an acid number of from 0 to one-half the acid number of said first polymer, said second polymer having a calculated Mn of greater than 20,000.

2. The multistage emulsion polymer of claim 1 wherein the acid number of said first polymer is from 30 to 65.

3. The multistage emulsion polymer of claim 1 or claim 2 wherein the calculated Tg of said first polymer is lower than 80° C.

4. An aqueous coating composition comprising a multistage aqueous emulsion polymer comprising
   from 10% to 30% by wt., based on the wt. of said multistage emulsion polymer, of a first polymer shell having an acid number of from 5 to 100, said first polymer having a calculated Mn of from 1000 to 4500 and a calculated Tg of lower than 100° C.; and
   from 70% to 90% by wt., based on the wt. of said multistage emulsion polymer, of a second polymer core having an acid number of from 0 to one-half the acid number of said first polymer, said second polymer having a calculated Mn of greater than 20,000.

5. The aqueous coating composition of claim 4 wherein the acid number of said first polymer is from 30 to 65.

6. The aqueous coating composition of claim 4 or claim 5 wherein the calculated Tg of said first polymer is lower than 80° C.

7. A method for providing a coating comprising
   (a) forming an aqueous coating composition comprising a multi-stage aqueous emulsion polymer comprising
   from 10% to 30% by wt., based on the wt. of said multistage emulsion polymer, of a first polymer shell having an acid number of from 5 to 100, said first polymer having a calculated Mn of from 1000 to 4500 and a calculated Tg of lower than 100° C.; and
   from 70% to 90% by wt., based on the wt. of said multistage emulsion polymer, of a second polymer core having an acid number of from 0 to one-half the acid number of said first polymer, said second polymer having a calculated Mn of greater than 20,000;
   (b) applying said aqueous coating composition to a substrate; and
   (c) drying, or allowing to dry, said applied aqueous coating composition.

8. The method for providing a coating of claim 7 wherein the acid number of said first polymer is from 30 to 65.

9. The method for providing a coating of claim 7 or claim 8 wherein the calculated Tg of said first polymer is lower than 80° C.

* * * * *